United States Patent
Shroder

(10) Patent No.: US 6,630,999 B2
(45) Date of Patent: Oct. 7, 2003

(54) COLOR MEASURING SENSOR ASSEMBLY FOR SPECTROMETER DEVICES

(75) Inventor: Robert E. Shroder, Windsor, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 56 days.

(21) Appl. No.: 09/846,897

(22) Filed: May 1, 2001

(65) Prior Publication Data

US 2002/0163641 A1 Nov. 7, 2002

(51) Int. Cl.[7] .................................................. G01J 3/51
(52) U.S. Cl. .................... 356/419; 356/416; 356/326
(58) Field of Search .................... 356/419, 416, 356/326

(56) References Cited

U.S. PATENT DOCUMENTS

| | | | | |
|---|---|---|---|---|
| 3,204,101 A | * | 8/1965 | Brumfield et al. | 250/83.3 |
| 4,054,389 A | * | 10/1977 | Owen | 356/189 |
| 4,318,123 A | * | 3/1982 | Knop | 358/43 |
| 4,402,611 A | * | 9/1983 | Yuasa | 356/405 |
| 4,993,834 A | * | 2/1991 | Carlhoff et al. | 356/328 |
| 5,017,798 A | * | 5/1991 | Murakami et al. | 250/572 |
| 5,166,755 A | * | 11/1992 | Gat | 356/419 |
| 5,218,473 A | * | 6/1993 | Seddon et al. | 359/589 |
| 5,272,518 A | * | 12/1993 | Vincent | 356/405 |
| 5,543,870 A | * | 8/1996 | Blanchard | 353/74 |
| 5,604,594 A | * | 2/1997 | Juffinger | 356/405 |
| 5,872,655 A | * | 2/1999 | Seddon et al. | 359/588 |
| 5,886,783 A | * | 3/1999 | Shapanus et al. | 356/300 |
| 5,917,605 A | * | 6/1999 | Colvin, Jr. | 356/417 |
| 6,031,892 A | * | 2/2000 | Karellas | 378/98.3 |
| 6,057,925 A | * | 5/2000 | Anthon | 356/419 |
| 6,080,989 A | * | 6/2000 | Royle et al. | 250/366 |
| 6,181,418 B1 | * | 1/2001 | Palumbo et al. | 356/328 |

OTHER PUBLICATIONS

Seddon, et al., *"Linear Variable Filters Match Photodiode Arrays,"* Laser Focus World, Technology Guide: Optical Coatings and Filters, Sep., 1991.*

* cited by examiner

Primary Examiner—Michael G. Lee
Assistant Examiner—Allyson Sanders
(74) Attorney, Agent, or Firm—Holme Roberts & Owen LLP

(57) ABSTRACT

A color measuring sensor assembly includes an optical filter such as a linear variable filter, an optical detector array positioned directly opposite from the optical filter a predetermined distance, and a coherent fiber faceplate having a plurality of optical fibers interposed between the optical filter and the detector array. A light beam propagating through the fiber faceplate from the optical filter to the detector array projects an upright, noninverted image of the optical filter onto a photosensitive surface of the detector array. Each optical fiber in the fiber faceplate is of limited aperture to control the tendency of light to diverge and to increase the resolution capabilities of the sensor assembly. The color measuring sensor assembly can be incorporated with other components into a spectrometer device such as a portable calorimeter having a compact and rugged construction.

34 Claims, 4 Drawing Sheets

COLOR MEASURING SENSOR ASSEMBLY FOR SPECTROMETER DEVICES

BACKGROUND OF THE INVENTION

1. The Field of the Invention

The present invention relates to optical devices for measuring light. In particular, the present invention relates to a compact spectrometer device for use in color discrimination or evaluation.

2. The Relevant Technology

Optical devices known generally as spectrometers have been developed for measuring and analyzing the spectral or color content of electromagnetic radiation in the frequency range or spectrum of optical wavelengths. These include from ultraviolet, through visible, to near-infrared wavelengths, which include the portion of the electromagnetic spectrum producing photoelectric effects, referred to herein as "light." Various kinds of opto-electronic devices are used for both imaging applications, such as by inspecting the spectral reflectance characteristics of a two-dimensional object, and for non-imaging applications.

Spectrometric measurements of light are performed in basically two ways, including dispersion-based techniques and filter-based techniques. In the dispersion-based approach, a radiation dispersion device such as a prism or diffraction grating is used to separate the incident polychromatic light into its spectral contents. The spectrally separated light is then projected onto a photodetector to measure the relative intensity in each spectral range. While dispersion-based devices can be effectively used in some applications, they have the disadvantage of being easily knocked out of alignment during use, and are thus not suitable for more rigorous applications in the field.

In the filter-based approach to spectral measurement, various types of optical filters are used in conjunction with photodetectors to measure and analyze light. For example, in one approach, a single band-pass filter is placed over a detector to measure a single spectral band of the incident light. In another variation of the filter-based technique, a filter wheel on which several filters are mounted is used in conjunction with a single photodetector or several photodetectors. Alternatively, the discrete filters in the filter wheel can be replaced with a continuous circular variable filter (CVF), which is placed over a detector. Further, the CVF may be placed over several detectors to provide simultaneous spectra in a limited number of bands. These filter-based techniques are limited for practical reasons to use in low resolution spectral measurements of a few bands of light and to non-contiguous bands only.

Other spectrometer devices have been developed that utilize linear variable filters in an attempt to enhance light measuring capabilities. For example, U.S. Pat. No. 5,166,755 to Gat (hereinafter "Gat") discloses a spectrometer apparatus including a spectrum resolving sensor containing an opto-electronic monolithic array of photosensitive elements which form a photodetector, and a continuous variable optical filter such as a linear variable filter (LVF) that is placed in an overlaying relationship with the photodetector. The LVF and photodetector are mounted in a single housing which serves to support at least the filter and the photodetector array in a unitary sensor assembly. The LVF is formed by depositing optical coatings directly onto the photodetector array, or a preformed LVF may be positioned in contact with or slightly above the array.

The device of Gat and other similar spectrometer devices have the disadvantage of containing no optical system disposed between the LVF and the photodetector array to aid in reducing the numerical aperture of the light incident on the array. This is important because the LVF works properly only within a limited cone angle of light (numeric aperture). Outside this limited angle, light of certain characteristic wavelengths may be transmitted through the LVF to the photodetector array at positions where the light would normally be reflected by the spectrally selective bandpass of the LVF. This effect is commonly referred to in the art as "blue shift" of the band-pass filter. The detector array is capable of receiving light within the full hemisphere and will detect these transmitted wavelengths when placed in contact with or very close to the LVF. In addition, if the LVF is spaced apart from the surface of the detector array, light emitted from one position of the LVF may reach more than one element of the detector array, thereby limiting the spectral resolving power of the LVF. In both cases, the net result is reduced resolution and an increased stray light characteristic of the device.

Accordingly, there is a need for an optical/detector device that overcomes or avoids the above problems and limitations.

SUMMARY AND OBJECTS OF THE INVENTION

It is an object of the invention to provide an optical system to aid in reducing the numerical aperture of light incident on a detector array.

It is another object of the invention to provide a sensor assembly for a spectrometer device with a uniform intensity distribution of light at the image plane of the detector array.

It is another object of the invention to provide a sensor assembly for a spectrometer device with an optical coupling mechanism between an optical filter and an optical detector that avoids any loss of resolution.

It is a further object of the invention to provide a smaller, more lightweight spectrometer device.

It is yet a further object of the invention to provide a more rugged and stable compact spectrometer device.

It is another object of the invention to provide a color measuring sensor assembly that can be used in a compact spectrometer device such as a colorimeter having a rugged construction.

It is a further object of the invention to provide a color measuring sensor assembly than can be employed in a variety of applications for use in color discrimination or evaluation.

To achieve the foregoing objects, and in accordance with the invention as embodied and broadly described herein, a color measuring sensor assembly is provided for use in manufacturing a spectrometer device such as a compact, portable colorimeter. The sensor assembly generally comprises an optical filter for selectively transmitting light, an optical detector for measuring the spectral characteristics of the light transmitted through the filter, and a coherent fiber faceplate interposed between the filter and the detector such that a light beam propagating through the fiber faceplate from the filter to the detector projects an upright, noninverted image of the filter onto a photosensitive surface of the detector. The sensor assembly can also include electronic structure for reading electrical signals from the detector to provide an output representative of the spectral characteristics of the light.

In one embodiment of the invention, the sensor assembly comprises a linear variable filter, a linear detector array having a photosensitive surface positioned directly opposite from the linear variable filter a predetermined distance, and a coherent fiber faceplate including a plurality of optical fibers interposed between the linear variable filter and the linear detector array. A light beam propagating through the optical fibers from the linear variable filter to the linear detector array projects an upright, noninverted image of the linear variable filter onto the photosensitive surface of the linear detector array.

The sensor assembly of the invention can be used to form a compact spectrometer device such as a portable colorimeter by operatively connecting the sensor assembly to various electronic and mechanical components, such as an illumination source, a detector circuit module, a signal processing module, and an output module. Such a spectrometer device can be employed in a variety of applications for color discrimination or spectral evaluation, including color matching or identification of various products, processing controls, medical diagnostics, printer calibration, agricultural applications, combustion monitoring, environmental monitoring, and in other areas requiring color measurement and spectral analysis.

These and other objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
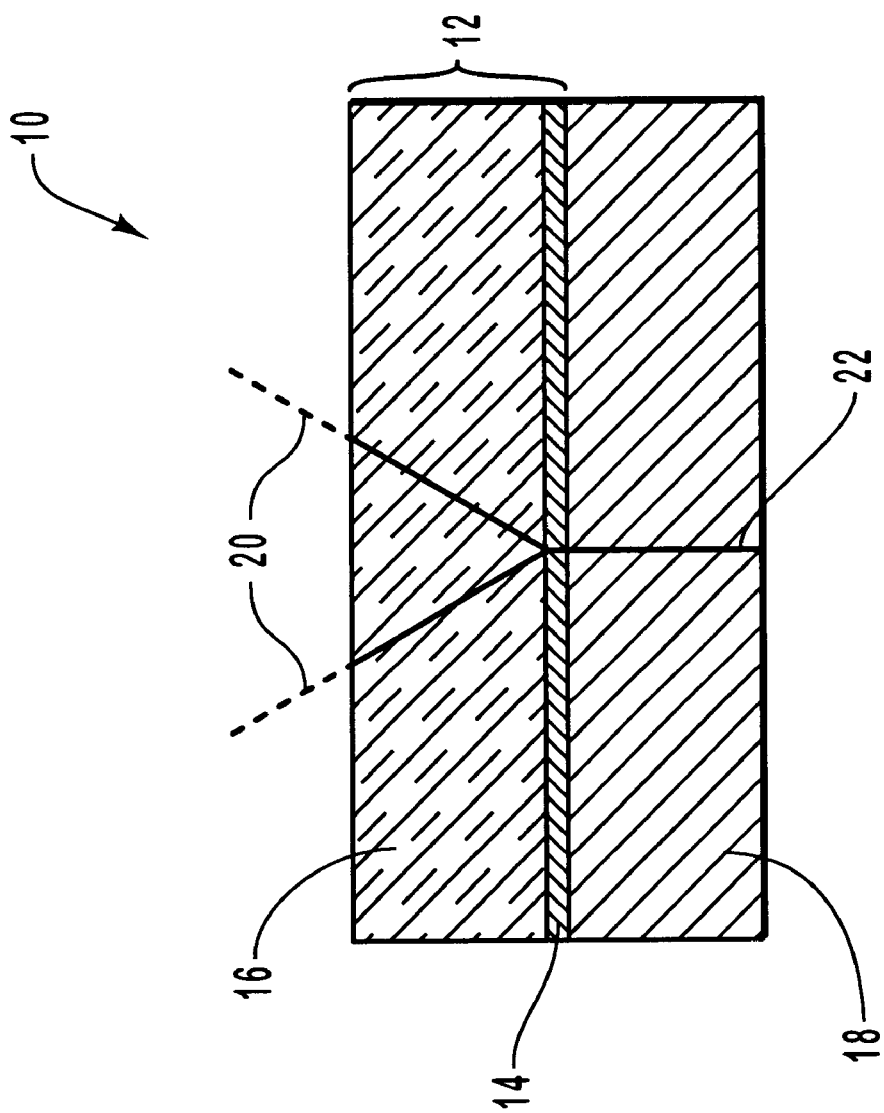
FIG. 1 is a schematic cross-sectional view of an optical sub-assembly according to one embodiment of the invention.

The present invention is directed to color measuring sensor assemblies that can be employed in a spectrometer device such as a colorimeter that is compact and rugged. The sensor assembly generally includes an optical filter, an optical detector array, and a plurality of fibers in a coherent fiber faceplate coupling the optical filter and the optical detector array. During operation of the sensor assembly, specified light beams pass through the optical filter, propagate through the fiber faceplate, and project an upright, noninverted image of the optical filter onto the photosensitive surface of the detector. Various aspects of the sensor assembly of the invention will be discussed as follows.

Referring to the drawings, wherein like structures are provided with like reference designations, the drawings only show the structures necessary to understand the present invention. Additional structures known in the art have not been included to maintain the clarity of the drawings.

FIG. 1 schematically illustrates an optical sub-assembly 10 according to one embodiment of the invention which can form part of a sensor assembly used in a spectrometer device. The optical sub-assembly 10 includes filter means for selectively transmitting light, such as an optical filter 12. The optical filter 12 has a thin interference film 14 and a transparent substrate 16 that supports interference film 14. The interference film 14 is preferably designed to provide a variable bandpass characteristic to optical filter 12. In one preferred embodiment, optical filter 12 is a linear variable filter (LVF), which is constructed to selectively transmit light in a linearly variable manner along the length thereof. In forming an LVF, a substrate is covered with a film in such a manner as to form a variable thickness coating having a substantially wedge-shaped profile across the length of the long dimension of the substrate. The thickness of the layers in the LVF is controlled during manufacture so as to create a filter with differing center wavelengths across the length thereof. This results in light being separated into its spectral colors along the length of the filter, e.g., from red light at one end to blue light at the other. The film of the LVF is typically made of stacked layers of all dielectric materials using hard, durable oxides, but may also be made of stacked layers of metal/dielectric materials such as silver and low index dielectrics. Other suitable filter means that could be used in the present invention include individual bandpass filters which can be bonded together to form a monolithic array.

The substrate 16 is preferably formed to have a relatively rectangular shape and is made of a material which is selected on the basis of the desired range of wavelengths in which the filter operates. Suitable materials for substrate 16 include fused silica, glass, and the like.

Adjacent to thin interference film 14 is a coherent fiber faceplate 18. Generally, a coherent fiber optic component includes many individual fiber optic elements all precisely aligned so that they can faithfully transmit an image. Therefore, coherent fiber faceplate 18 contains numerous optical fibers that are configured to precisely transmit an image from an input surface at interference film 14 to an output surface adjacent to an optical detector (not shown). In addition, the faceplate can be constructed to absorb stray light that does not enter the fibers of the faceplate, thus ensuring that such light does not propagate to the detector array at unintended locations and thereby decrease the resolution of the device.

Generally, the fiber faceplate can be formed according to methods and designs that are currently known in the art. Each fiber in the faceplate preferably is a few microns in diameter. In addition, the fibers in the faceplate need to have an appropriate numerical aperture to maintain a total internal reflection for light of the desired incident angles. The numerical aperture is defined as the sine of one half of the acceptance angle of the fiber. For example, numerical aperture values of 0.1 to 0.4 correspond to acceptance angles of 11 degrees to 46 degrees. Optical fibers will only transmit light that enters at an angle that is equal to or less than the acceptance angle of the fiber. In order to maintain high resolution, faceplates preferable for use in the present invention include fibers with a moderate numerical aperture of less than about 0.2. Additionally, an absorbing glass component may be added to the cladding layer of each fiber such that light incident at thin interference film 14 which does not enter the core of an individual fiber will not propagate to the detector array.

As illustrated, incident light 20 may impact sub-assembly 10 from a variety of angles to reach a segment of thin interference film 14 which has the appropriate bandpass characteristics to transmit the light. The fiber faceplate 18 receives the light transmitted through optical filter 12 and transmits it within one or more fibers as fiber contained light 22. Similarly, each segment of interference film 14 that transmits light has a corresponding fiber or fibers in the faceplate that receives and transmits the light. Thus, the image of interference film 14 is precisely transmitted by faceplate 18 to project an upright, noninverted image of the thin film even though light incident upon film 14 may have an angle of incidence differing from normal.

Figure 2:
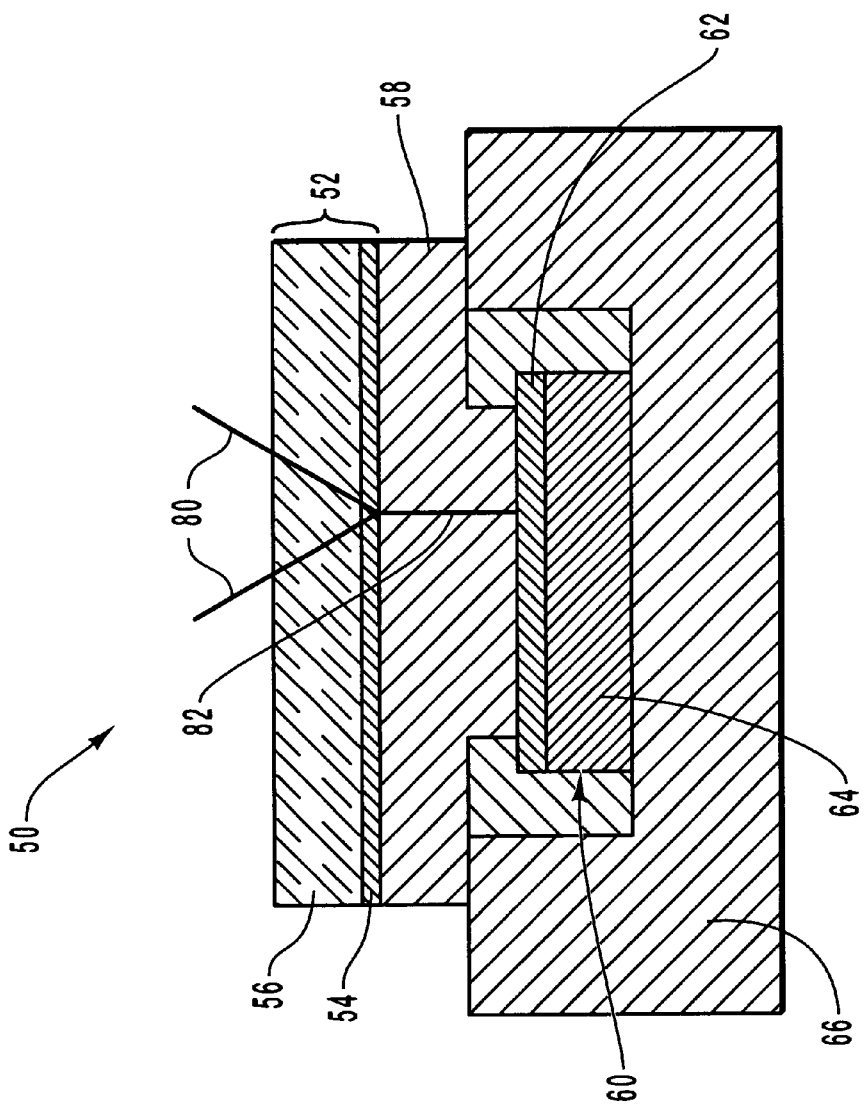
FIG. 2 is a schematic cross-sectional view of a sensor assembly according to one embodiment of the invention.

Referring now to FIG. 2, a color measuring sensor assembly 50 according to one embodiment of the invention for use in a spectrometer device is schematically illustrated. The sensor assembly 50 generally includes filter means for selectively transmitting light, such as an optical filter 52, a coherent fiber faceplate 58, and detector means for measuring the spectral characteristics of the light transmitted through the filter means, such as an optical detector array 60. The fiber faceplate 58 is interposed between optical filter 52 and detector array 60 to provide optical communication therebetween. The optical filter 52, such as an LVF, includes a thin interference film 54 and a transparent substrate 56 that supports interference film 54. The interference film 54, substrate 56, and fiber faceplate 58 are formed substantially as described hereinabove for the corresponding structures in sub-assembly 10.

The optical detector array 60 is employed to measure the spectral characteristics of the light 82 incident upon and transmitted through interference film 54. The detector array 60 includes an image chip 62 such as a photodiode array that is supported on a substrate 64 made of a semiconductor material. The image chip 62 has a photosensitive surface positioned directly opposite from optical filter 52. The photodiode array of image chip 62 is formed of a series of silicon detectors with sensor sites or pixels that can be addressed individually.

The optical detector array 60 can be selected from a variety of linear detector array devices that are commercially available, including parallel output type devices or various charge storage or transfer devices which are customarily referred to as charge coupled devices (CCD), charge injection devices (CID), charge coupled photo diode arrays (CCPD), and the like. These devices include a monolithic or hybrid integrated circuit which contains the electronics for sequential scanning and reading the signal of each pixel in the detector array, and are manufactured utilizing large scale integration (LSI) technology.

As illustrated in FIG. 2, fiber faceplate 58 is coupled to array 60 to form a contiguous optical path for transmitting incident light 80 from filter 52 to detector array 60. Preferably, fiber faceplate 58 is coupled as closely as possible to the active area of detector array 60, replacing the usual glass cover plate which typically protects the detector surface. In particular, fiber faceplate 58 is adjacent to image chip 62, which is supported by substrate 64. The fiber faceplate 58 receives the light transmitted through filter 52, transmitting the light within one or more fibers as fiber contained light 82.

The optical fibers in fiber faceplate 58 preferably have a diameter of about 3 to about 25 microns, and each photosensitive region of the detector array has a width of about 14 to about 50 microns. Thus, the light directed through each fiber covers only a small fraction of the surface area of each photosensitive element in the detector array. This ensures that the photosensitive elements are receiving a high resolution image of the filter which is of substantially uniform illumination.

Preferably, image chip 62 and substrate 64 are encased by a housing 66. The housing 66 is preferably formed of ceramic or metallic materials. The housing 66 provides a secure and durable structure to support image chip 62 and substrate 64, and to couple with faceplate 58.

Figure 3:
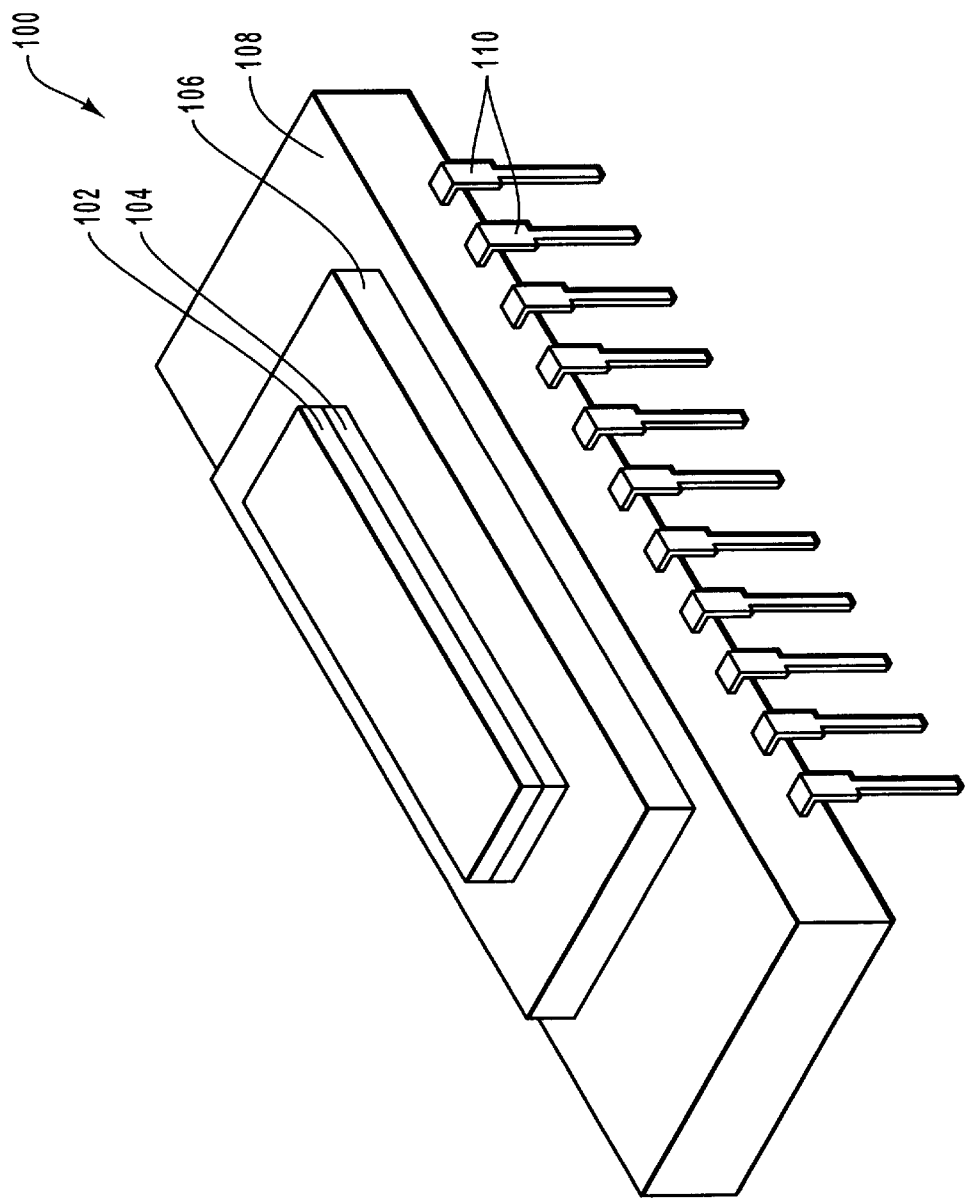
FIG. 3 is a perspective view of a sensor assembly according to another embodiment of the invention.

FIG. 3 is a perspective view of a color measuring sensor assembly 100 for use in a compact spectrometer device according to another embodiment of the invention. The sensor assembly 100 includes a blocking filter 102, an optical filter 104 underlying blocking filter 102, and a coherent fiber faceplate 106 interposed between optical filter 104 and a detector array (not shown). A housing 108 encloses the detector array, which has a series of electrical connection pins 110 that protrude from housing 108.

The blocking filter 102 is an optional feature of the invention. The blocking filter selectively excludes light of wavelengths outside of the design bandpass range of the optical filter and in this way improves the efficiency of the device.

The optical filter 104, fiber faceplate 106, the detector array, and housing 108 are as described hereinabove for corresponding structures shown in FIGS. 1 and 2. The electrical connection pins 110 are used both to connect sensor assembly 100 to other portions of a compact spectrometer device and to transmit electronic data generated by the detector array.

The color measuring sensor assembly of the present invention provides many advantages and benefits. The sensor assembly, including the optical filter, coherent fiber faceplate, and optical detector array, can be used in a spectrometer device such as a compact calorimeter having a rugged construction and a small volume that is suitable for use in the field or other environments that have a limited size or are hostile to conventional color measuring devices.

The current invention eliminates the problem of stray light reaching unintended photosensitive elements of the detector array by using a coherent fiber faceplate of limited numerical aperture. Conceptually, each fiber in the fiber faceplate acts as a "light pipe," transmitting light within the fiber in a total internal reflection. However, only light of a particular numerical aperture is able to enter the fiber, with the remaining light being either reflected or absorbed. Therefore, light incident on the optical filter, such as an LVF, or generated within the optical filter by scattering is: 1) reflected by the optical filter; 2) transmitted through the optical filter and the fiber faceplate; or 3) absorbed within the fiber faceplate. In particular, light transmitted through an LVF at high incident angle is absorbed within the fiber faceplate and is thereby stopped from reaching the detector array. In this way, only the light intended to reach the detector array actually does so. This preserves the designed resolving power of the LVF. Further, because the coherent fiber faceplate directly couples the light from the LVF surface to the detector array, no loss of coupling efficiency occurs.

Another advantage of the sensor assembly of the invention is that it can be made from existing, commercially available components, providing for easier manufacture and reduced cost. The use of a coherent fiber faceplate for projecting the image of the LVF on the detector array greatly reduces diffuse leaks of the LVF and enhances spectral performance while preserving the resolution of the filter.

This allows a spectrometer to be constructed that achieves the maximum resolution allowable by the bandwidth of the filter. The sensor assembly can be configured to selectively sample any section of the spectrum that might be chosen, such as the visible section of the spectrum having wavelengths from about 400 nm to about 700 nm.

Once formed, the sensor assembly of the invention can be provided to instrument manufacturers as a separate part for use in a variety of color analyzing photometric instruments. The sensor assembly can also be directly incorporated into a spectrometer device such as a calorimeter during a single manufacturing process. For example, the sensor assembly can be incorporated with other standard components into a portable, compact calorimeter such as a hand-held device for color measurement.

Commonly assigned U.S. Pat. No. 6,057,925 to Anthon (hereinafter "the Anthon patent"), the disclosure of which is incorporated herein by reference, discloses a compact spectrometer device that could be modified to utilize the sensor assembly of the invention. The Anthon patent discloses that one embodiment of a spectrometer device, such as a compact calorimeter, has four major subsystems or modules, including an optical module which would include the sensor assembly, a detector circuit module, a signal processing module, and an output module.

Figure 4:
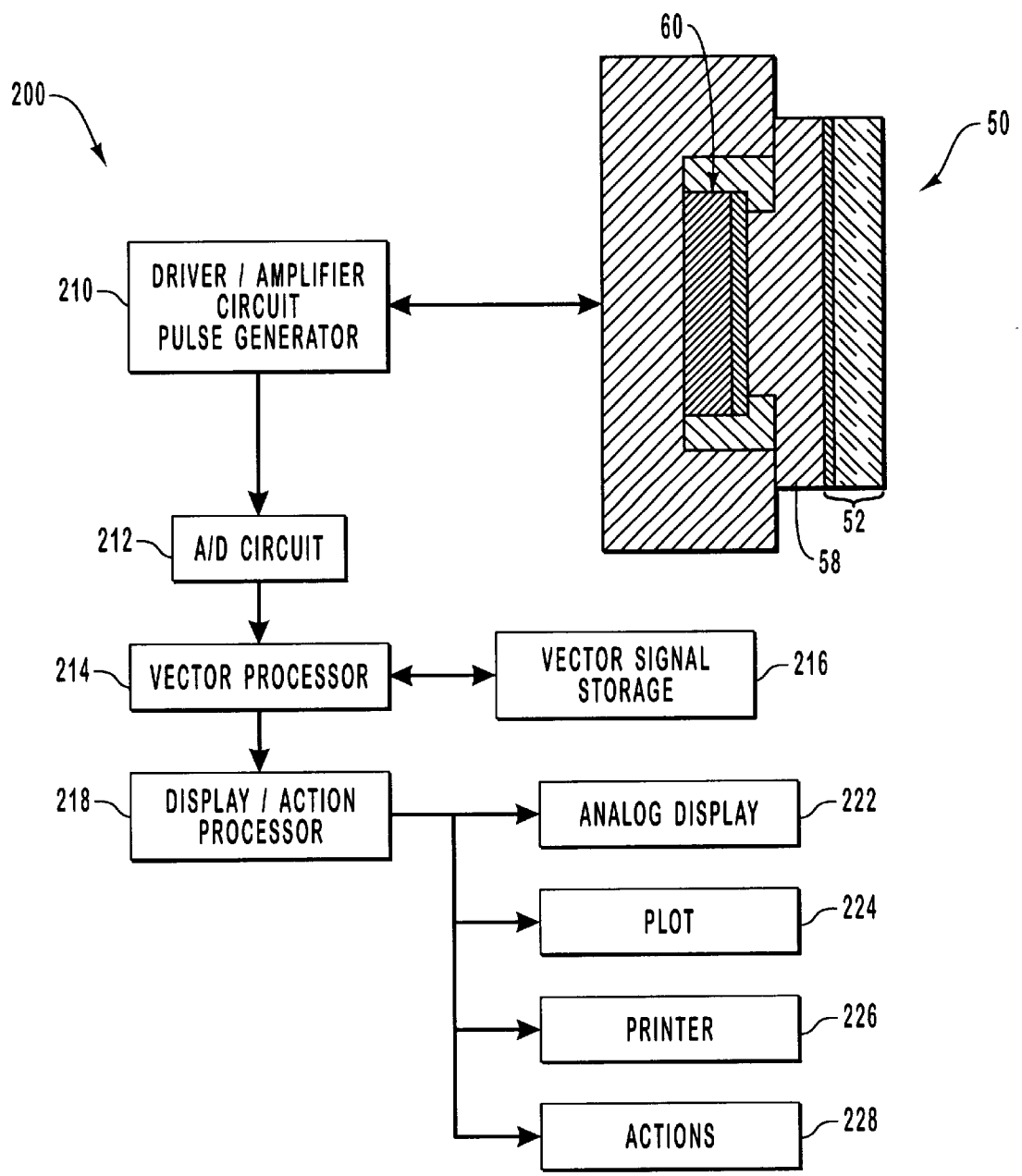
FIG. 4 is a schematic block diagram of a spectrometer device according to the present invention.

Another aspect of the present invention therefore is directed to the use of these modules in a spectrometer device 200, as illustrated in the block diagram in FIG. 4. The optical module includes a sensor assembly 50 that forms an electro-optical head for the calorimeter. The sensor assembly 50 has components similar to those discussed above, including an optical filter 52 such as a LVF, a coherent fiber faceplate 58, and a detector array 60.

The detector circuit module for device 200 includes various conventional electronic detector circuit components 210 which are operatively connected with detector array 60. Such electronic components include a driver/amplifier circuit, a pulse generator or clock, a trigger, an equalizer, and the like. Preferably, these components are provided on the same semiconductor substrate ("on-chip") as the detector array using standard integrated circuit fabrication technology.

The signal processing module for device 200 includes conventional signal processing components such as an analog-to-digital (A/D) circuit 212 which is operatively connected to the output of the detector circuit module for signal digitization. The output of A/D circuit 212 is operatively connected to a digital signal processor such as a vector processor 214 used for signal array processing and manipulation. The vector processor 214 is operatively connected to a vector signal storage device 216 such as a conventional memory device for storing a signal array. The output from vector processor 214 is operatively connected to an output processor 218 for converting the signal array to an appropriate display or action signal. The signal processing module for device 200 is preferably provided in the form of an integrated circuit or chip.

The output module for the colorimeter can include various display or printing devices which are operatively connected to output processor 218. These can include an analog visual display 222 such as a scope device, video monitor, cathode ray tube device, or flat screen device such as a liquid crystal display (LCD) or plasma display. The flat screen devices are particularly preferred when the display is carried by the same housing which holds other modules of device 200 such as in a hand-held colorimeter device. In addition, the output module can include an analog plot device 224 such as a graph producing device, a printer 226, or various action devices 228 such as "go/no go" indicators. The output module can also include a digital display such as a table of numbers or a display of critical numbers.

The detector circuit and signal processing modules of device 200 provide an electronic means for reading the electrical signals generated by the detector array in order to produce an output representative of the spectral characteristics of the light to be measured. During operation of device 200, a test object is illuminated by reflected or transmitted light from a light source such as an illuminator which can provide natural light or lamp light through a conventional optical system to the test object. The light from the test object is filtered by the LVF in the sensor assembly and passes through the coherent fiber faceplate to strike the photosensitive surface of the detector array, which converts the filtered light to electrical signals. The electronic means scan or poll the signals in the individual pixels of the detector array and thereafter process and/or store the information obtained for contemporaneous or future readout or display.

A variety of standard software programs and algorithms related to colorimetry and spectroscopy techniques can be used to run the detector circuit, signal processing, and output modules of device 200 in order to process and manipulate the signals from the detector array. Colorimetry techniques utilize a methodology which combines the spectral reflectances of the test object with the spectral power of a standard illuminant and standardized spectral color-matching functions representing the average human observer to calculate tristimulus values X, Y, and Z defining the color of the object. The color of a light beam from the test object is quantified by calculating the tristimulus values according to standard equations. Software for implementing various colorimetry techniques can be used to quantify the color of a light beam and give the results in standard terms. For example, software can be employed that calculates the color used, measures the color, or produces color coordinates that relate to specific colors on the object being measured.

The sensor assembly incorporated into a spectrometer device according to the present invention can be used in many different applications which require color discrimination or evaluation. The device of the invention can be utilized for general color discrimination such as in identifying objects or merchandise by color, including the color specification of raw materials and finished products in various industries. In addition, the device of the invention can be used for color matching of paints, inks, dyes, fabrics, paper, or a variety of other objects.

Further, the spectrometer device of the invention can be utilized in various medical applications such as medical diagnostics. For example, the device can be employed in the detection of changes in skin color or body fluid color which are not visible to the eye. The device can also be used in medical color evaluation such as for detecting anemia, inflammation, jaundice, etc.

The spectrometer device of the present invention can also be utilized in various agricultural applications. These include color evaluation of food products such as measuring color to determine the ripeness of fruit, or color discrimination to distinguish between foods of different colors. The device can be used to detect the need for nutrients in soil, to detect the need for water, and to detect disease in plants. The device can also be used to measure the effectiveness of soil nutrients, water, and pesticides utilized in agricultural settings.

Other miscellaneous applications for the spectrometer device of the invention include process control, such as sensing color changes in a test object or causing corrective action to be taken in a process. Further, the device can be used for interior decorating, desktop publishing applications such as color printer calibration, combustion monitoring, environmental monitoring, as well as in any other technology requiring color analysis.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A color measuring sensor assembly for a spectrometer device, the assembly comprising:
    filter means for selectively transmitting light;
    detector means for measuring spectral characteristics of the light transmitted through the filter means; and
    a fiber faceplate interposed between the filter means and the detector means such that a light beam propagating through the fiber faceplate from the filter means to the detector means projects an upright, noninverted image of the filter means onto the detector means.

2. The sensor assembly of claim 1, wherein the filter means comprises a transparent substrate and an interference film formed thereon.

3. The sensor assembly of claim 1, wherein the filter means comprises a linear variable filter.

4. The sensor assembly of claim 1, further comprising a blocking filter applied over the filter means.

5. The sensor assembly of claim 1, wherein the detector means is a structure having a photosensitive surface positioned directly opposite from the filter means at a predetermined distance.

6. The sensor assembly of claim 1, wherein the detector means comprises a linear detector array.

7. The sensor assembly of claim 6, wherein the linear detector array comprises a photodiode array on a semiconductor substrate.

8. The sensor assembly of claim 6, wherein the linear detector array is selected from the group consisting of parallel output type devices, charge coupled devices, charge injection devices, and charge coupled photodiode arrays.

9. The sensor assembly of claim 1, wherein the fiber faceplate comprises a plurality of optical fibers, each of which have a diameter from about 3 microns to about 25 microns.

10. The sensor assembly of claim 1, wherein the fiber faceplate comprises a plurality of optical fibers, each of which have a numerical aperture of less than about 0.2.

11. A color measuring sensor assembly for a spectrometer device, the assembly comprising:
    a linear variable filter for selectively transmitting light in a predetermined range of wavelengths along a length thereof;
    a linear detector array having a photosensitive surface positioned directly opposite from the linear variable filter a predetermined distance; and
    a fiber faceplate including a plurality of optical fibers interposed between the linear variable filter and the linear detector array such that a light beam propagating through the optical fibers from the linear variable filter to the linear detector array projects an upright, noninverted image of the linear variable filter onto the photosensitive surface of the linear detector array.

12. The sensor assembly of claim 11, wherein the linear variable filter comprises a transparent substrate and an interference film formed thereon.

13. The sensor assembly of claim 11, further comprising a blocking filter applied over the linear variable filter.

14. The sensor assembly of claim 11, wherein the linear detector array comprises a photodiode array on a semiconductor substrate.

15. The sensor assembly of claim 11, wherein the linear detector array is selected from the group consisting of parallel output type devices, charge coupled devices, charge injection devices, and charge coupled photodiode arrays.

16. The sensor assembly of claim 11, wherein the fiber faceplate comprises a plurality of optical fibers, each of which have a diameter from about 3 microns to about 25 microns.

17. The sensor assembly of claim 11, wherein the fiber faceplate comprises a plurality of optical fibers, each of which have a numerical aperture of less than about 0.2 microns.

18. A spectrometer device for analyzing polychromatic light, the device comprising:
    filter means for selectively transmitting light;
    detector means for measuring spectral characteristics of the light transmitted through the filter means;
    a fiber faceplate interposed between the filter means and the detector means such that a light beam propagating through the fiber faceplate from the filter means to the detector means projects an upright, noninverted image of the filter means onto the detector means; and
    electronic means for reading electrical signals from the detector array to provide an output representative of the spectral characteristics of the light.

19. The device of claim 18, wherein the filter means comprises a transparent substrate and an interference film formed thereon.

20. The device of claim 18, wherein the filter means comprises a linear variable filter.

21. The device of claim 18, wherein the detector means comprises a photodiode array on a semiconductor substrate.

22. The device of claim 18, wherein the detector means comprises a linear detector array.

23. The device of claim 22, wherein the linear detector array is selected from the group consisting of parallel output type devices, charge coupled devices, charge injection devices, and charge coupled photodiode arrays.

24. The device of claim 18, wherein the fiber faceplate comprises a plurality of optical fibers, each of which have a diameter from about 3 microns to about 25 microns.

25. The device of claim 18, wherein the fiber faceplate comprises a plurality of optical fibers, each of which have a numerical aperture of less than about 0.2.

26. The device of claim 18, further comprising a display or printing device operatively connected to the electronic means.

27. A spectrometer device for analyzing polychromatic light, the device comprising:
    an optical module including:
        a linear variable filter for selectively transmitting light in a predetermined range of wavelengths along a length thereof;
        a linear detector array having a photosensitive surface positioned directly opposite from the linear variable filter a predetermined distance; and a fiber faceplate including a plurality of optical fibers interposed between the linear variable filter and the linear detector array such that a light beam propagating through the optical fibers from the linear variable filter to the linear detector array projects an upright, noninverted image of the linear variable filter onto the photosensitive surface of the linear detector array;

a detector circuit module including electronic detector circuit components which are operatively connected with the linear detector array;

a signal processing module, including signal processing components, which is operatively connected to the output of the detector circuit module for signal digitization; and an output module including one or more output devices operatively connected to the signal processing module.

28. The device of claim 27, wherein the linear detector array comprises a photodiode array on a semiconductor substrate.

29. The device of claim 27, wherein the linear detector array is selected from the group consisting of parallel output type devices, charge coupled devices, charge injection devices, and charge coupled photodiode arrays.

30. The device of claim 27, wherein the fiber faceplate comprises a plurality of optical fibers, each of which have a diameter from about 3 microns to about 25 microns.

31. The device of claim 27, wherein the fiber faceplate comprises a plurality of optical fibers, each of which have a numerical aperture of less than about 0.2.

32. The device of claim 27, wherein at least one output device comprises a visual display device.

33. The device of claim 27, wherein at least one output device comprises a printer or analog plot device.

34. A method of analyzing polychromatic light, the method comprising;

directing a beam of light onto a linear variable filter, wherein the linear variable filter selectively transmits light of predetermined wavelength bands at preselected regions of the linear variable filter and reflects the remaining incident light;

receiving the light transmitted through the linear variable filter into individual optical fibers of a coherent fiber faceplate, wherein light incident on the coherent fiber faceplate that is at an angle outside the acceptance angle of the individual fibers is either reflected or absorbed by the fibers; and propagating light through the optical fibers from the linear variable filter to a linear detector array to project an upright, noninverted image of the linear variable filter onto a photosensitive surface of the linear detector array.

* * * * *